(12) United States Patent
Chung et al.

(10) Patent No.: US 9,703,027 B2
(45) Date of Patent: Jul. 11, 2017

(54) WIRE GRID POLARIZER, LIQUID CRYSTAL DISPLAY HAVING THE SAME AND METHOD OF MANUFACTURING THE SAME

(71) Applicant: Samsung Electronics Co., Ltd., Suwon-si, Gyeonggi-do (KR)

(72) Inventors: Jaeseung Chung, Seoul (KR); Dongouk Kim, Pyeongtaek-si (KR); Joonyong Park, Suwon-si (KR); Jihyun Bae, Seoul (KR); Bongsu Shin, Seoul (KR); Sunghoon Lee, Seoul (KR); Sukgyu Hahm, Gyeongju-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 82 days.

(21) Appl. No.: 14/541,652

(22) Filed: Nov. 14, 2014

(65) Prior Publication Data
US 2015/0323721 A1 Nov. 12, 2015

(30) Foreign Application Priority Data
May 7, 2014 (KR) .................. 10-2014-0054433

(51) Int. Cl.
*G02F 1/1335* (2006.01)
*G02B 5/30* (2006.01)

(52) U.S. Cl.
CPC ..... *G02B 5/3058* (2013.01); *G02F 1/133528* (2013.01); *G02F 2001/133548* (2013.01)

(58) Field of Classification Search
CPC ............. G02B 5/3058; G02F 1/133528; G02F 2001/133548

USPC ........................................................... 349/96
See application file for complete search history.

(56) References Cited

U.S. PATENT DOCUMENTS

| 2009/0040607 A1* | 2/2009 | Amako ............... G02B 5/1809 359/485.01 |
| 2009/0135355 A1* | 5/2009 | Kumai .................. B82Y 20/00 349/114 |
| 2010/0328768 A1* | 12/2010 | Lines ................... G02B 5/0252 359/485.05 |
| 2013/0153534 A1 | 6/2013 | Resnick et al. |

FOREIGN PATENT DOCUMENTS

| KR | 1020080082116 A | 9/2008 |
| KR | 1020080091981 A | 10/2008 |
| KR | 1020080092784 A | 10/2008 |
| KR | 1020130073391 A | 7/2013 |

* cited by examiner

*Primary Examiner* — Charles Chang
(74) *Attorney, Agent, or Firm* — Cantor Colburn LLP

(57) ABSTRACT

A wire grid polarizer includes a substrate, a first layer and a second layer disposed on the first layer, in which a first region and a second region are defined in the first layer, the first layer includes: a first wire grid including a plurality of first wires and disposed in the first region, where the first wires are spaced apart from each other, and no wire grid is disposed in the second region; and a first protection layer which covers the first wire grid, a third region and a fourth region are defined in the second layer, and the second layer includes a second wire grid including a plurality of second wires and disposed in the third region, where the second wires are spaced apart from each other, and no wire grid is disposed in the fourth region.

11 Claims, 15 Drawing Sheets

WIRE GRID POLARIZER, LIQUID CRYSTAL DISPLAY HAVING THE SAME AND METHOD OF MANUFACTURING THE SAME

RELATED APPLICATIONS

This application claims priority to Korean Patent Application No. 10-2014-0054433, filed on May 7, 2014, and all the benefits accruing therefrom under 35 U.S.C. §119, the content of which in its entirety is herein incorporated by reference.

BACKGROUND

1. Field

The disclosure relates to a wire grid polarizer having a large area, a liquid crystal display including the wire grid polarizer, and a method of manufacturing the wire grid polarizer.

2. Description of the Related Art

Light emitted from a light source may be controlled using polarization characteristics thereof. For example, in a liquid crystal display including a liquid crystal panel, the liquid crystal panel functions as a shutter for blocking or transmitting light by varying the polarization direction of linearly polarized light passing therethrough using liquid crystals. A liquid crystal display may include first and second polarizing plates having polarization directions that are perpendicular to each other, a liquid crystal layer between the first and second polarizing plates, and a thin film transistor ("TFT") in each pixel. A voltage is selectively applied to each pixel according to the switching operation of the TFT. In such a liquid crystal display, when a voltage is applied to a pixel, liquid crystal molecules may be aligned in a line such that incident light may pass through the liquid crystal layer without a change in the polarization direction thereof, and the light is blocked by the second polarizing plate. In such a liquid crystal display, when the voltage is not applied to the pixel, the liquid crystal molecules may be arranged in a twisted manner such that incident light passes through the liquid crystal layer while the polarization direction thereof is changed according to the arrangement of the liquid crystal molecules, and the light passes through the second polarizing plate. Accordingly, when liquid crystal is in a twisted state, a pixel may be shown as white, and when liquid crystal is not in a twisted state, the pixel may be shown as black. However, since the optical efficiency of a polarizing plate is typically low, a liquid crystal display using a polarizing plate may have a low optical efficiency.

Furthermore, a large liquid crystal display may include a large-sized polarizing plate.

SUMMARY

Provided are embodiments of a wire grid polarizer that may be effectively and efficiently manufactured to have a large size.

Provided are embodiments of a liquid crystal display including a wire grid polarizer that may be effectively and efficiently manufactured to have a large size.

Provided are embodiments of a method of manufacturing a large-size wire grid polarizer.

According to an embodiment of the invention, a liquid crystal display includes: a light source unit; a first substrate disposed on the light source unit; an electrode layer disposed on the first substrate; a second substrate separate from the electrode layer; a polarizing plate disposed on the second substrate; a liquid crystal layer disposed between the electrode layer and the second substrate; and a wire grid polarizer disposed between the light source and the first substrate, where the wire grid polarizer includes: a first layer, in which a first region and a second region are defined, where a first wire grid including a plurality of first wires is disposed in the first region, the first wires are spaced apart from each other, and no wire grid is disposed in the second region; and a second layer disposed on the first layer and in which a third region and a fourth region are defined, where a second wire grid including a plurality of second wires is disposed in the third region, the second wires are spaced apart from each other, and no wire grid is disposed in the fourth region.

In an embodiment, the first region and the third region may not overlap each other, and the second region and the fourth region may not overlap each other.

In an embodiment, the first to fourth regions may be arranged in such a manner that the first wires and the second wires may be arranged at regular intervals when viewed from a top plan view.

In an embodiment, the fourth region may be disposed to correspond to the first region and the third region may be disposed to correspond to the second region such that the first wires and the second wires may be arranged at regular intervals when viewed from a top plan view.

In an embodiment, each of the first wires and the second wires may include a metal.

In an embodiment, the metal of each of the first wires and the second wires may include aluminum (Al), silver (Ag), gold (Au), copper (Cu), nickel (Ni), platinum (Pt) or a combination thereof.

In an embodiment, the second layer may further include a second protection layer which covers the third region and the fourth region.

In an embodiment, the liquid crystal display may further include a third layer disposed on the second protection layer, where a fifth region and a six region are defined in the third layer, a third wire grid including a plurality of third wires is disposed in the fifth region, the third wires are spaced apart from each other, and no wire grid is disposed in the sixth region.

In an embodiment, the first region, the third region and the fifth region may not overlap each other, and the second region, the fourth region and the sixth region may not overlap each other.

In an embodiment, the first region, the third region and the fifth region may partially overlap each other, and the second region, the fourth region and the sixth region may partially overlap each other, where only two of the first wires, the second wires and the third wires may be arranged to overlap each other across the first layer, the second layer and the third layer.

According to another embodiment of the invention, a wire grid polarizer includes: a substrate; a first layer disposed on the substrate, where a first region and a second region are defined in the first layer, and the first layer includes a first wire grid including a plurality of first wires and disposed in the first region, where the first wires are spaced apart from each other, and no wire grid is disposed in the second region, and a first protection layer which covers the first and second regions; and a second layer disposed on the first layer, where a third region and a fourth region are defined in the second layer, and the second layer includes a second wire grid including a plurality of second wires and disposed in the third region, where the second wires are spaced apart from each other, and no wire grid is disposed in the fourth region.

In an embodiment, the first region and the third region may not overlap each other, and the second region and the fourth region may not overlap each other.

In an embodiment, a plurality of first wire grids and a plurality of second wire grids are disposed along the first layer and the second layer, respectively.

In an embodiment, the fourth region may be disposed to correspond to the first region and the third region may be disposed to correspond to the second region such that the first wires and the second wires may be arranged at regular intervals when viewed from a top plan view.

In an embodiment, each of the first wires and the second wires may include a metal.

In an embodiment, the metal of each of the first wires and the second wires may include aluminum (Al), silver (Ag), gold (Au), copper (Cu), nickel (Ni), platinum (Pt) or a combination thereof.

In an embodiment, the second layer may further include a second protection layer covering the third region and the fourth region.

In an embodiment, the wire grid polarizer may further include a third layer disposed on the second protection layer, where a fifth region and a six region are defined in the third layer, a third wire grid including a plurality of third wires is disposed in the fifth region, the third wires are spaced apart from each other, and no wire grid is disposed in the sixth region.

In an embodiment, the first region, the third region and the fifth region may not overlap each other, and the second region, the fourth region and the sixth region may not overlap each other.

In an embodiment, The first region, the third region and the fifth region may partially overlap each other, and the second region, the fourth region and the sixth region may partially overlap each other, where only two of the first wires, the second wires and the third wires may be arranged to over overlap each other across the first layer, the second layer and the third layer.

According to another embodiment of the invention, a method of manufacturing a wire grid polarizer includes: providing a first layer on a substrate; providing a first mask on the first layer; providing a first region, in which a first wire grid is provided, and a second region, in which no wire grid is provided, by patterning and etching the first layer based on a pattern of the first mask; providing the first wire grid in the first region through a nanoimprinting process; providing a first protection layer on the first region and the second region; providing a second layer on the first protection layer; providing a second mask on the second layer; providing a third region, in which a second wire grid is provided, and a fourth region, in which no wire grid is provided, by patterning and etching the second layer based on a pattern of the second mask; and providing the second wire grid in the third region through a nanoimprinting process.

According to another embodiment of the invention, a method of manufacturing a wire grid polarizer includes: providing a first layer on a substrate; providing a first mask on the first layer; defining a first region and a second region on the substrate by etching the first layer based on a pattern of the first mask; providing the first wire grid on the first region through a nanoimprinting process; providing a first protection layer on the first region and the second region; providing a second mask pattern on the second layer; etching a region of the first protection layer corresponding to the second region using the second mask; providing a second layer on the second region; and providing a second wire grid on the second region through a nanoimprinting process.

BRIEF DESCRIPTION OF THE DRAWINGS

The above and other features of the invention will become more apparent by describing in further detail exemplary embodiments thereof with reference to the accompanying drawings, in which.

DETAILED DESCRIPTION

Figure 1:
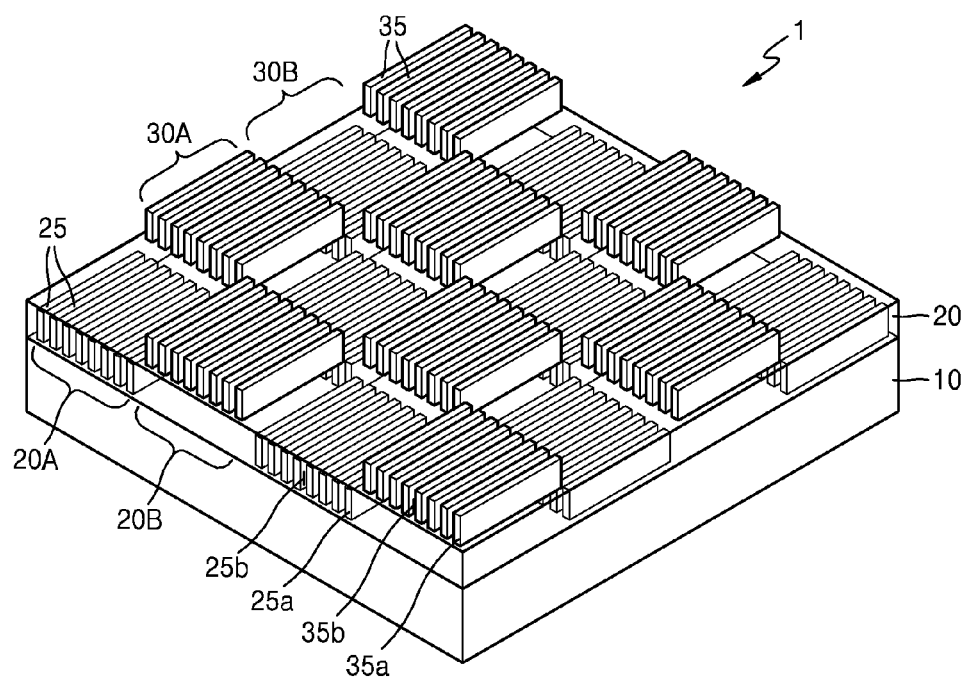
FIG. 1 is a perspective view of an embodiment of a wire grid polarizer according to the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of a wire grid polarizer, a liquid crystal display including the wire grid polarizer, and a method of manufacturing the wire grid polarizer will be described in detail with reference to the accompanying drawings.

Figure 2:
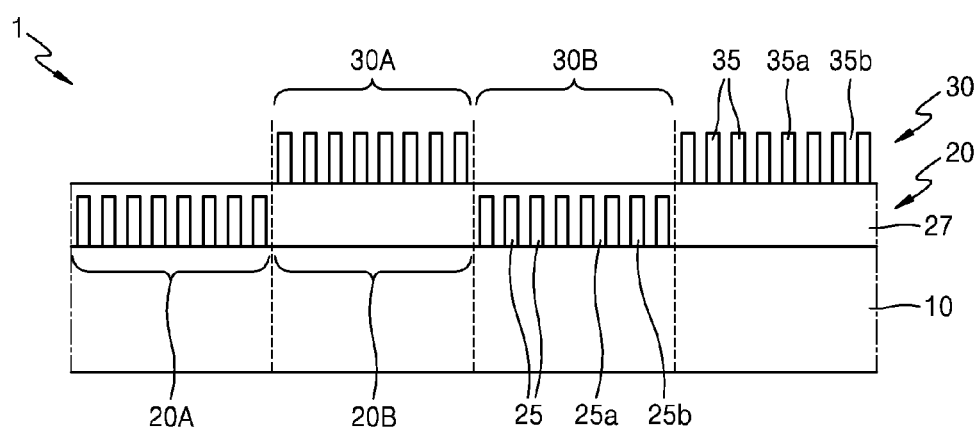
FIG. 2 is a front view of an embodiment of the wire grid polarizer of FIG. 1.
Figure 3:
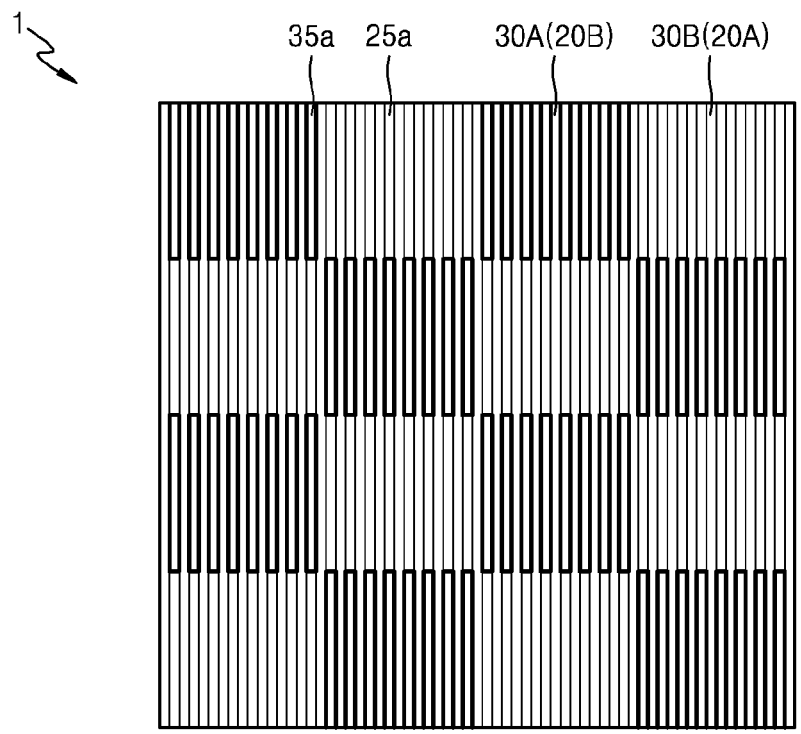
FIG. 3 is a plan view of an embodiment of the wire grid polarizer of FIG. 1.

FIG. 1 is a perspective view of an embodiment of a wire grid polarizer 1 according to the invention, and FIGS. 2 and 3 are a front view and a plan view of the wire grid polarizer 1 of FIG. 1, respectively.

Referring to FIGS. 1 to 3, an embodiment of the wire grid polarizer 1 may include a substrate 10, a first layer 20 on the substrate 10, and a second layer 30 on the first layer 20. The substrate 10 may be a transparent substrate that transmits light. In one embodiment, for example, the substrate 10 may be a glass substrate or a transparent plastic substrate.

The first layer 20 may include first wire grids 25. The first layer 20 may include first regions 20A in which the first wire grids 25 are disposed and second regions 20B in which no wire grid is disposed. The second regions 20B may be defined as a portion between neighboring first wire grids 25. Each of the first wire grids 25 may include a plurality of first wires 25a that are separate, e.g., spaced apart, from each other. In one embodiment, for example, in each of the first wire grids 25, the first wires 25a may be arranged substantially parallel to each other at regular intervals, e.g., constant intervals. First grooves 25b may be formed or defined between the first wires 25a. The pitch of the first wires 25a may be less than a predetermined wavelength of light, e.g., the wavelength of light to be used. In one embodiment, for example, the pitch between the first wires 25a may be about ¼ or less times the predetermined wavelength of light. In one embodiment, for example, the pitch between the first wires 25a may be greater than about zero (0) nanometer (nm) and equal to or less than about 200 nm. In one embodiment, for example, the first wires 25a may have a fill factor that is equal to or greater than about 0.3 and less than about 1. The fill factor refers to a sectional area ratio of the first wires 25a and the first grooves 25b. The height of the first wires 25a may be about 100 nm or greater, for example, and the aspect ratio of the first wires 25a may be about 1 or greater, for example.

The first wires 25a may include a metal. In one embodiment, for example, the first wires 25a may include aluminum (Al), silver (Ag), gold (Au), copper (Cu), nickel (Ni), platinum (Pt) or a combination thereof.

In such an embodiment, the second regions 20B do not include a wire grid. The second regions 20B may buffer the effects of errors that may occur in neighboring regions when the first wires 25a are formed. In an embodiment, the second regions 20B may be arranged to allow the first regions 20A to meet each other in small areas, to thereby reduce errors.

The first regions 20A and the second regions 20B may be alternately arranged with each other in the first layer 20. The first regions 20A and the second regions 20B may be arranged in various manners. The first regions 20A and the second regions 20B may be arranged in a predetermined arrangement, e.g., a first arrangement. In one embodiment, for example, as shown in FIG. 1, the first regions 20A and the second regions 20B are arranged in the form of a go board, but the arrangement of the first regions 20A and the second regions 20B are not limited thereto. In an alternative embodiment, the first regions 20A and the second regions 20B may be arranged in another manner. In an embodiment, where the first regions 20A and the second regions 20B are arranged in the form of a go board, neighboring first regions 20A may meet each other only at corners thereof, and thus areas in which the first regions 20A meet each other may be effectively minimized.

The first layer 20 may further include a first protection layer 27. The first protection layer 27 may include or be formed of a transparent material. The first protection layer 27 may cover the first regions 20A and the second regions 20B. In one embodiment, for example, the first wire grids 25 may be disposed in the first protection layer 27. However, the first protection layer 27 is not limited thereto. In one embodiment, for example, the first protection layer 27 may be disposed on the first wire grids 25.

The second layer 30 may include second wire grids 35. The second layer 30 includes third regions 30A in which the second wire grids 35 are disposed, and fourth regions 30B in which no wire grid is disposed. Each of the second wire grids 35 may include a plurality of second wires 35a that are separate from each other. In one embodiment, for example, in each of the second wire grids 35, the second wires 35a may be arranged substantially parallel to each other at regular intervals. Second grooves 35b may be defined or formed between the second wires 35a. The pitch of the second wires 35a may be less than the predetermined wavelength of light. In one embodiment, for example, the pitch between the second wires 35a may be about ¼ or less times the predetermined wavelength of light. In one embodiment, for example, the pitch between the second wires 35a may be greater than about zero (0) nm and equal to or less than about 200 nm. In one embodiment, for example, the second wires 35a may have a fill factor that is equal to or greater than about 0.3 and less than about 1. The second wires 35a may have an aspect ratio equal to or greater than about 1. The second wire grids 35 may be substantially the same as the first wire grids 25.

The second wires 35a may include a metal. In one embodiment, for example, the second wires 35a may aluminum (Al), silver (Ag), gold (Au), copper (Cu), nickel (Ni), platinum (Pt) or a combination thereof.

The fourth regions 30B do not include a wire grid. The fourth regions 30B may buffer the effects of errors that may occur in neighboring regions when the second wires 35a of the third regions 30A are formed.

The third regions 30A and the fourth regions 30B may be alternately arranged with each other in the second layer 30. The third regions 30A and the fourth regions 30B may be arranged in various manners. The third regions 30A and the fourth regions 30B may be arranged in a predetermined arrangement, e.g., a second arrangement. In one embodiment, for example, as shown in FIG. 1, the third regions 30A and the fourth regions 30B are arranged in the form of a go board. However, the third regions 30A and the fourth regions 30B are not limited thereto. In an alternative embodiment, the third regions 30A and the fourth regions 30B may be arranged in another manner or form.

The first regions 20A, the second regions 20B, the third regions 30A and the fourth regions 30B may be arranged in relation to each other. As shown in FIG. 3, the first regions 20A, the second regions 20B, the third regions 30A and the fourth regions 30B may be arranged to allow the first wires 25a and the second wires 35a to be alternately arranged with each other at regular intervals when viewed from a top plan view. In such an embodiment, when viewed from a top plan view, as a whole, the first wires 25a and the second wires 35a may be arranged at regular intervals corresponding to pitches between the first wires 25a or the second wires 35a, and thereby define a single grid.

In one embodiment, for example, the first regions 20A, the second regions 20B, the third regions 30A and the fourth regions 30B may be arranged in such a manner that the first regions 20A do not overlap the third regions 30A and the second regions 20B do not overlap the fourth regions 30B. In an embodiment, the fourth regions 30B may be disposed to correspond to, e.g., on top of, the first regions 20A, and the third regions 30A may be disposed to correspond to the second regions 20B. In such an embodiment, the first regions 20A may overlap the fourth regions 30B, and the second regions 20B may overlap the third regions 30A. Therefore, when the first layer 20 and the second layer 30 of the wire grid polarizer 1 are viewed from a top plan view as a whole, an optical effect substantially the same as that of the first wire grids 25 and the second wire grids 35 arranged in a single layer may be obtained.

When the pitch of wires is less than the wavelength of incident light, light polarized substantially parallel to the wires may be reflected and light polarized perpendicular to the wires may pass through the wires. Accordingly, based on such an optical property, the wire grid polarizer 1 may transmit only first polarized light and may reflect second polarized light. The first polarized light may be p-polarized light, and the second polarized light may be s-polarized light. The width, thickness and pitch of the first and second wires 25a and 35a may determine the transmissivity and reflectivity of the wire grid polarizer 1.

In such an embodiment, where the wire grid polarizer 1 transmits first polarized light and reflects second polarized light for reusing the second polarized light, the optical efficiency of the wire grid polarizer 1 may be high.

Figure 4:
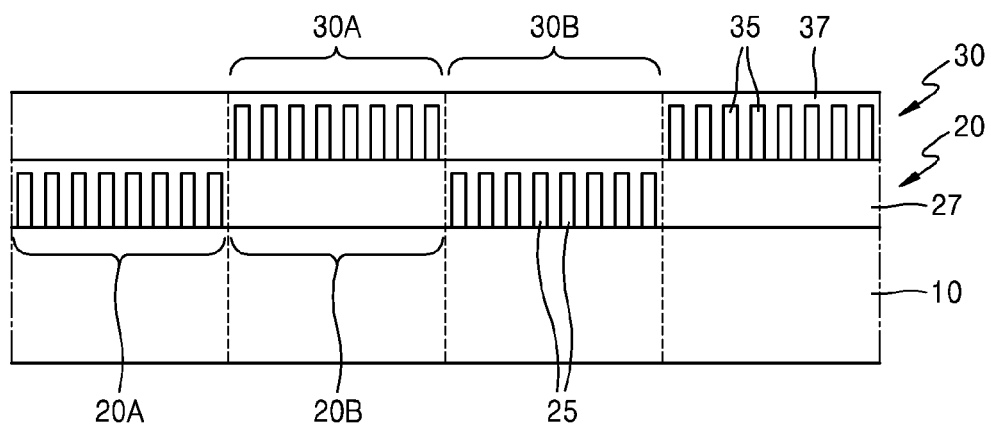
FIG. 4 is a view of an embodiment of the wire grid polarizer including a second protection layer.

FIG. 4 is a view of an embodiment of the wire grid polarizer further including a second protection layer. Referring to FIG. 4, in an embodiment, the second layer 30 may further include a second protection layer 37 for protecting the second wire grids 35. The second protection layer 37 may include or be formed of a transparent material. The second protection layer 37 may cover the third regions 30A and the fourth regions 30B. In one embodiment, for example, the second protection layer 37 may be disposed in the second wire grids 35. However, the second protection layer 37 is not limited thereto. In one embodiment, for example, the second protection layer 37 may be disposed on the second wire grids 35.

Figure 5:
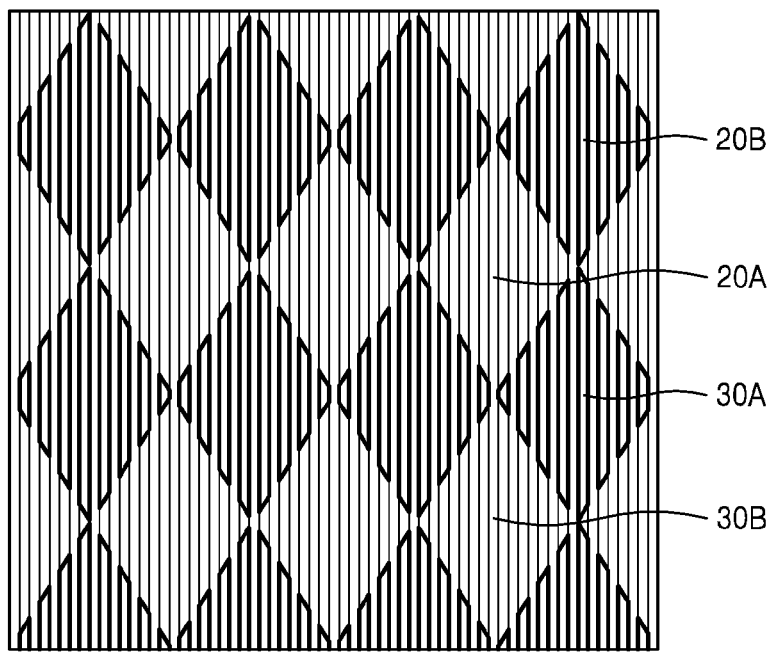
FIGS. 5 and 6 are views illustrating arrangement patterns of first to fourth regions of the wire grid polarizer in embodiments of the wire grid polarizer according to the invention.
Figure 6:
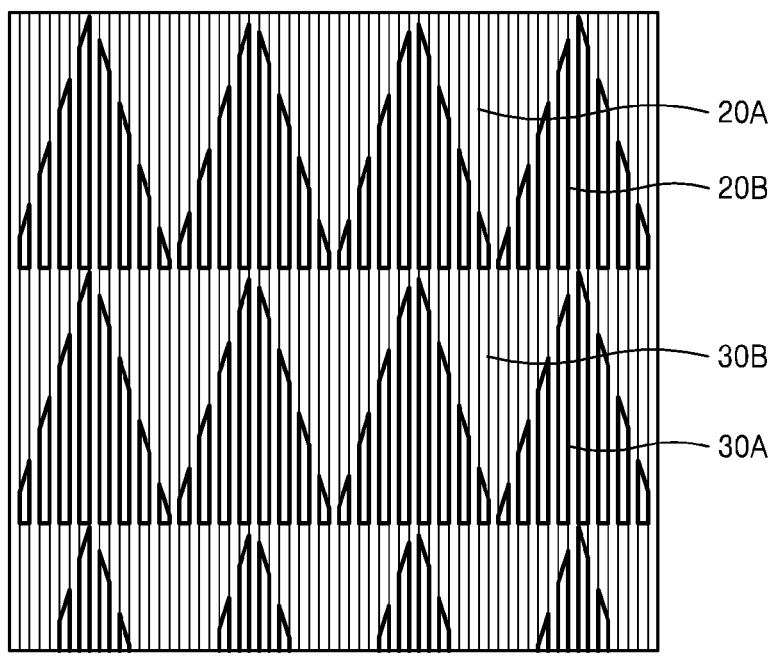

FIG. 5 illustrates the arrangement of the first regions 20A, the second regions 20B, the third regions 30A and the fourth regions 30B in an alternative embodiment of the wire grid polarizer. Referring to FIG. 5, the first regions 20A and the second regions 20B may have a diamond shape and may be alternately arranged with each other, and the third regions 30A and the fourth regions 30B may have a diamond shape and may be alternately arranged with each other. FIG. 6 illustrates the arrangement of the first regions 20A, the second regions 20B, the third regions 30A and the fourth regions 30B in another alternative embodiment of the wire grid polarizer. Referring to FIG. 6, the first regions 20A and the second regions 20B may have a triangular shape and may be alternately arranged with each other, and the third regions 30A and the fourth regions 30B may have a triangular shape and may be alternately arranged with each other. The first regions 20A and the third regions 30A do not overlap each other, and the second regions 20B and the fourth regions 30B do not overlap each other. In such an embodiment, the first regions 20A, the second regions 20B, the third regions 30A and the fourth regions 30B may be arranged in various manners to allow the first wires 25a and the second wires 35a to be arranged at regular intervals when the first regions 20A, the second regions 20B, the third regions 30A and the fourth regions 30B are viewed from a top plan view.

Figure 7:
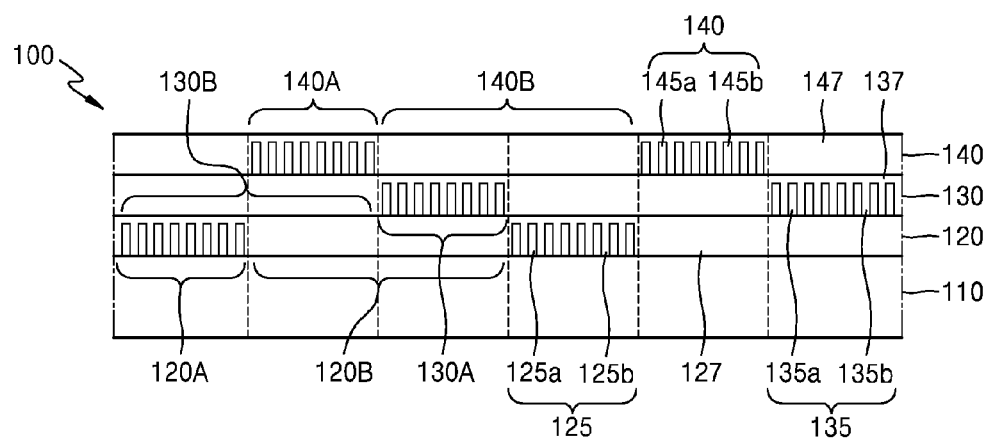
FIG. 7 is a front view of another embodiment of a wire grid polarizer according to the invention.

FIG. 7 illustrates another embodiment of a wire grid polarizer 100 according to the invention.

The wire grid polarizer 100 may include a substrate 110, a first layer 120 on the substrate 110, a second layer 130 on the first layer 120, and a third layer 140 on the second layer 130. The substrate 110 may be a transparent substrate that transmits light. In one embodiment, for example, the substrate 110 may be a glass substrate or a transparent plastic substrate.

The first layer 120 may include first regions 120A including first wire grids 125 and second regions 120B not including a wire grid. Each of the first wire grids 125 may include a plurality of first wires 125*a* that are separate from each other. First grooves 125*b* may be defined or formed between the first wires 125*a*.

The second regions 120B do not include a wire grid, and the first regions 120A and the second regions 120B may be alternately arranged with each other. The first regions 120A and the second regions 120B may be arranged in various manners. The first regions 120A and the second regions 120B may be arranged in a predetermined arrangement, e.g., a first arrangement. In one embodiment, for example, as shown in FIG. 7, the second regions 120B may be larger than the first regions 120A.

The first layer 120 may further include a first protection layer 127. The first protection layer 127 may include or be formed of a transparent material. The second layer 130 may include third regions 130A including wire grids 135 and fourth regions 130B not including a wire grid. Each of the second wire grids 135 may include a plurality of second wires 135*a* that are separate from each other. Second grooves 135*b* may be defined or formed between the second wires 135*a*.

The fourth regions 130B do not include a wire grid, and the third regions 130A and the fourth regions 130B may be alternately arranged with each other. The third regions 130A and the fourth regions 130B may be arranged in various manners. The third regions 130A and the fourth regions 130B may be arranged in a predetermined arrangement, e.g., a second arrangement. The third regions 130A may be smaller than the fourth regions 130B.

The second layer 130 may further include a second protection layer 137. The second protection layer 137 may include or be formed of a transparent material. The third layer 140 may include fifth regions 140A in which third wire grids 145 are disposed, and sixth regions 140B in which no wire grid is disposed. Each of the third wire grids 145 may include a plurality of third wires 145*a* that are separate from each other. Third grooves 145*b* may be defined or formed between the third wires 145*a*.

The sixth regions 140B do not include a wire grid, and the fifth regions 140A and the sixth regions 140B may be alternately arranged with each other. The fifth regions 140A and the sixth regions 140B may be arranged in various manners. The fifth regions 140A and the sixth regions 140B may be arranged in a predetermined arrangement, e.g., a third arrangement. The fifth regions 140A may be smaller than the sixth regions 140B.

In an embodiment shown in FIG. 7, the first wire grids 125, the second wire grids 135 and the third wire grids 145 have substantially the same structures and functions as those of the first wire grids 25 and the second wire grids 35 of an embodiment described above with reference to FIGS. 1 to 3, and any repetitive detailed descriptions thereof will be omitted.

The first regions 120A, the second regions 120B, the third regions 130A, the fourth regions 130B, the fifth regions 140A and the sixth regions 140B may be arranged in relation to each other. In an embodiment, when the first regions 120A, the second regions 120B, the third regions 130A, the fourth regions 130B, the fifth regions 140A and the sixth regions 140B are viewed from a plan view, the first wires 125*a*, the second wires 135*a* and the third wires 145*a* may be arranged at regular intervals. In such an embodiment, when the wire grid polarizer 100 is viewed from a plan view, as a whole, the first wires 125*a*, the second wires 135*a* and the third wires 145*a* may be arranged at regular intervals and may be shown as wire grids in a single layer.

In one embodiment, for example, the first regions 120A, the third regions 130A and the fifth regions 140A may not overlap each other when viewed from a plan view such that the first wires 125*a*, the second wires 135*a* and the third wires 145*a* may be arranged at regular intervals with each other. The second regions 120B and the fourth regions 130B may partially overlap each other, and the fourth regions 130B and the sixth regions 140B may partially overlap each other. Therefore, when the first layer 120, the second layer 130 and the third layer 140 of the wire grid polarizer 1 are viewed as a whole, an optical effect substantially the same as an optical effect by wires arranged in a single layer may be obtained. The third layer 140 may further include a third protection layer 147.

The number of layers of the wire grid polarizer 100, regions of the layers including wire grids, and regions of the layers not including a wire grid may be variously adjusted as long as wires of the wire grid polarizer 100 are arranged at regular intervals when the wire grid polarizer 100 is viewed on a plan view.

Figure 8:
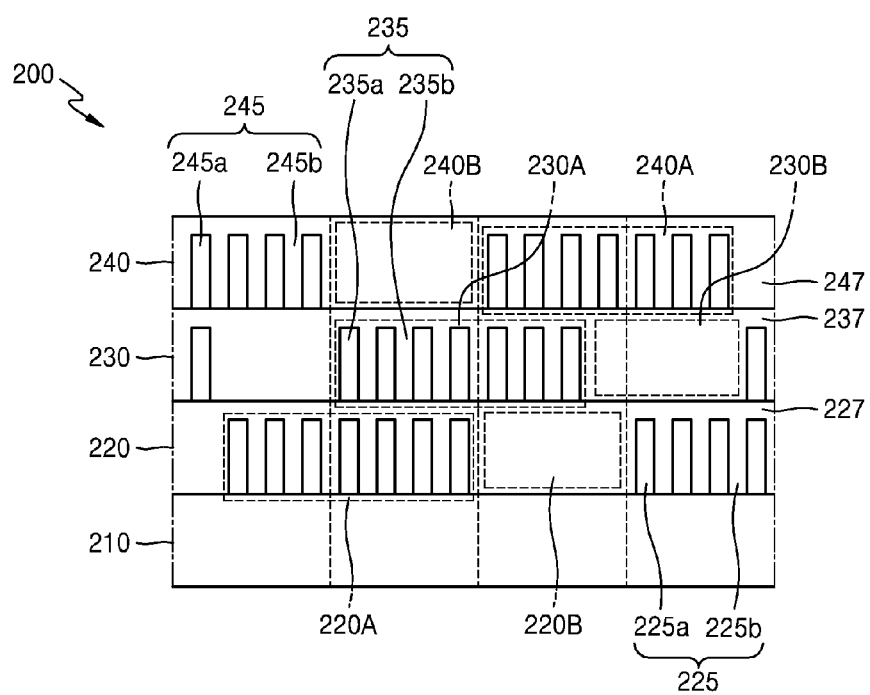
FIG. 8 is a front view of another embodiment of a wire grid polarizer according to the invention.

FIG. 8 illustrates another embodiment of a wire grid polarizer 200 according to the invention. The wire grid polarizer 200 may include a substrate 210, a first layer 220 on the substrate 210, a second layer 230 on the first layer 220 and a third layer 240 on the second layer 230. The substrate 210 may be a transparent substrate that transmits light. In one embodiment, for example, the substrate 210 may be a glass substrate or a transparent plastic substrate.

The first layer 220 may include first regions 220A, in which first wire grids 225 are disposed, and second regions 220B in which no wire grid is disposed. Each of the first wire grids 225 may include a plurality of first wires 225*a* that are separate from each other. First grooves 125*b* may be defined or formed between the first wires 225*a*.

The second regions 220B do not include a wire grid, and the first regions 220A and the second regions 220B may be alternately arranged with each other. The first regions 220A and the second regions 220B may be arranged in various manners. The first regions 220A and the second regions 220B may be arranged in a predetermined arrangement, e.g., a first arrangement. In one embodiment, for example, the first regions 220A may be larger than the second regions 220B.

The first layer 220 may further include a first protection layer 227. The first protection layer 227 may include or be formed of a transparent material. The second layer 230 may include third regions 230A, in which second wire grids 235 are disposed, and fourth regions 230B in which no wire grid is disposed. Each of the second wire grids 235 may include a plurality of second wires 235*a* that are separate from each other. Second grooves 235*b* may be defined or formed between the second wires 235*a*.

The fourth regions 230B do not include a wire grid, and the third regions 230A and the fourth regions 230B may be alternately arranged with each other. The third regions 230A and the fourth regions 230B may be arranged in various manners. The third regions 230A and the fourth regions 230B may be arranged in a predetermined arrangement, e.g., a second arrangement. The third regions 230A may be larger than the fourth regions 230B.

The second layer 230 may further include a second protection layer 237. The second protection layer 237 may be formed of a transparent material. The third layer 240 may include fifth regions 240A including third wire grids 245 and sixth regions 240B not including a wire grid. Each of the third wire grids 245 may include a plurality of third wires 245a that are separate from each other. Third grooves 245b may be formed between the third wires 245a.

The sixth regions 240B do not include a wire grid, and the fifth regions 240A and the sixth regions 240B may be alternately arranged. The fifth regions 240A and the sixth regions 240B may be arranged in various manners. The fifth regions 240A and the sixth regions 240B may be arranged in a predetermined arrangement, e.g., a third arrangement. The fifth regions 240A may be larger than the sixth regions 240B.

The first wire grids 225, the second wire grids 235, and the third wire grids 245 have substantially the same structures and functions as those of the first wire grids 25 and the second wire grids 35 described with reference to FIGS. 1 to 3, and thus detailed descriptions thereof will not be repeated.

The first regions 220A, the second regions 220B, the third regions 230A, the fourth regions 230B, the fifth regions 240A and the sixth regions 240B may be arranged in relation to each other. The first regions 220A, the second regions 220B, the third regions 230A, the fourth regions 230B, the fifth regions 240A and the sixth regions 240B may be arranged in such a manner that two of the first wires 225a, the second wires 235a and the third wires 245a are arranged to overlap each other across the first layer 220, the second layer 230 and the third layer 240, that is, in a thickness direction of the first layer 220, the second layer 230 and the third layer 240. In one embodiment, for example, as a whole, the first wires 225a, the second wires 235a and the third wires 245a are arranged in two layers. In such an embodiment, when the wire grid polarizer 200 is viewed as a whole, the wire grid polarizer 200 may have two wire grid layers.

In such an embodiment, when the first layer 220, the second layer 230 and the third layer 240 of the wire grid polarizer 1 are viewed as a whole, an optical effect may be substantially the same as an optical effect by wires uniformly arranged in two layers may be obtained. The light transmitting efficiency of a wire grid polarizer may vary depending on the depth, thickness and pitch of wires. In one embodiment, for example, the wires may have an aspect ratio of about 1 or greater. When the depth of wires is larger than the width of the wires, a high light transmitting efficiency may be obtained. However, if the size of wires is less than the wavelength of incident light, it is difficult to form the wires to have a large depth. In an embodiment, wire grids may be stacked in a plurality of layers as shown in FIG. 8, such that the effect of increasing the depth of wires may be obtained.

The third layer 240 may further include a third protection layer 247.

Figure 9:
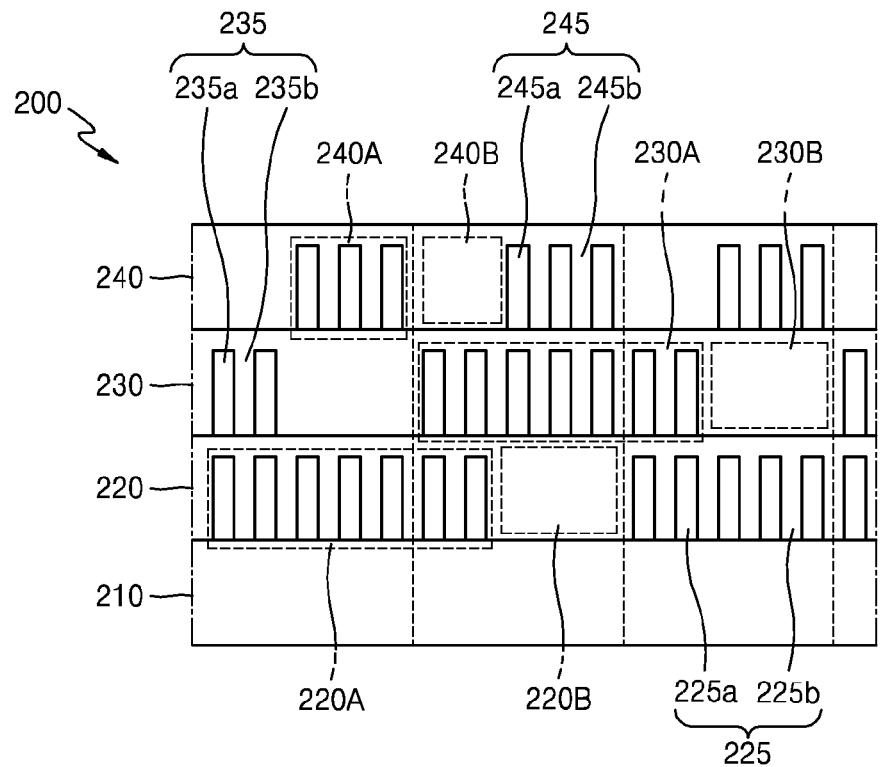
FIG. 9 is a view of arrangement structures of first to sixth regions of the wire grid polarizer shown in FIG. 8.

FIG. 9 illustrates an alternative embodiment where the first regions 220A, the second regions 220B, the third regions 230A, the fourth regions 230B, the fifth regions 240A and the sixth regions 240B illustrated in FIG. 8 arranged in a different manner. As shown in FIG. 9, the number of layers, regions of the layers including wire grids, and regions of the layers not including a wire grid may be variously adjusted to allow wires to be arranged at regular intervals in at least one layer when the wire grid polarizer 200 is viewed as a whole in cross-section.

Figure 10:
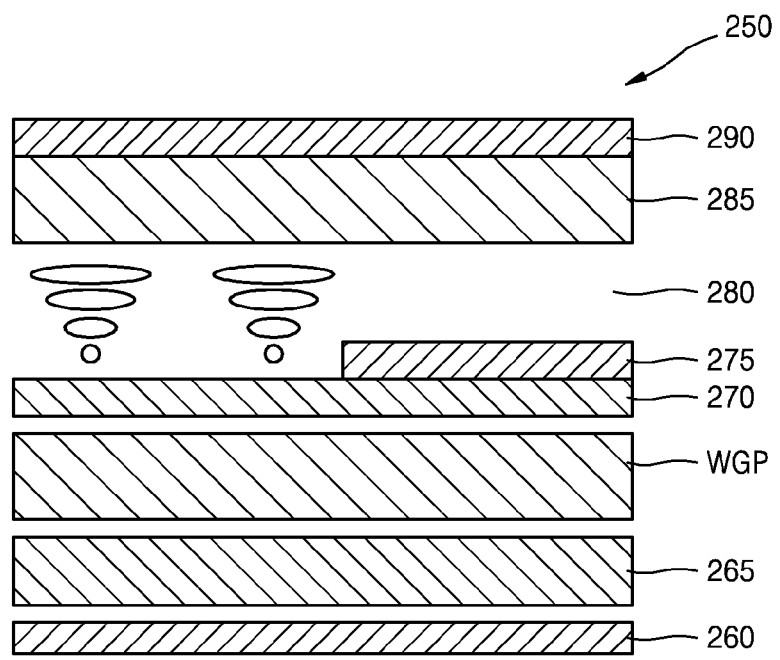
FIG. 10 is schematic view of an embodiment of a liquid crystal display including a wire grid polarizer according to the invention.

FIG. 10 is schematic view of an embodiment of a liquid crystal display 250 according to the invention. The liquid crystal display 250 may include a light source unit 265 and a wire grid polarizer WGP. The wire grid polarizer WGP may reflect a portion of light emitted from the light source unit 265 and may transmit a non-reflected portion of the light.

A first substrate 270 is disposed on the wire grid polarizer WGP, and an electrode layer 275 is disposed on the substrate. The electrode layer 275 and a second substrate 285 that are separate from each other are on the wire grid polarizer WGP. A liquid crystal layer 280 may be disposed between the electrode layer 275 and the second substrate 285. A polarizing plate 290 may be disposed above, e.g., on a side of, the second substrate 285.

In an embodiment, a reflection plate 260 may be disposed under the light source unit 265.

The light source unit 265 may be a direct light-type or edge light-type light source unit. The direct light-type light source unit may be disposed under an in-cell polarizer ("IP") to emit light directly to a liquid crystal display, and the edge light-type light source unit may emit light to a wire grid polarizer through a light guide plate (not shown). The direct light-type light source unit or the edge light-type light source unit may be applied to the liquid crystal display 250 in an embodiment of the invention. The light source unit 265 may include a light source such as a light-emitting diode ("LED"), an organic light-emitting diode ("OLED"), and a cold cathode fluorescent light ("CCFL"), for example. However, the light source unit 265 is not limited thereto.

The wire grid polarizer WGP may be an embodiment of the wire grid polarizers 1, 100 or 200 described above with reference to FIGS. 1 to 9. The wire grid polarizer WGP may be manufactured to have a large size to be provided in a large liquid crystal display.

Next, an embodiment of a method of manufacturing a wire grid polarizer according to the invention will be described with reference to FIGS. 11 to 22.

Figure 11:
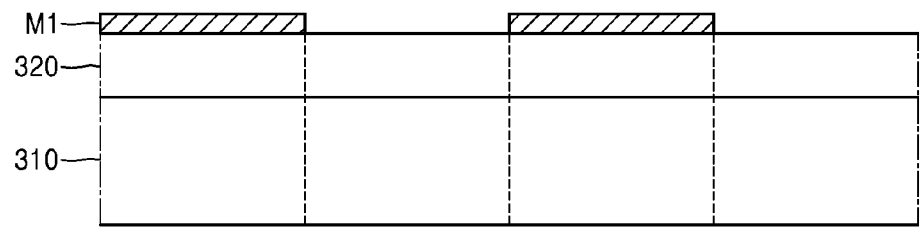
FIGS. 11 to 22 are views illustrating an embodiment of a method of manufacturing a wire grid polarizer according to the invention.

Referring to FIG. 11, in an embodiment, a first layer 320 is disposed on a substrate 310, and a first mask M1 is disposed on the first layer 320. The substrate 310 may be a transparent substrate that transmits light. In one embodiment, for example, the substrate 310 may be a glass substrate or a transparent plastic substrate.

Figure 12:
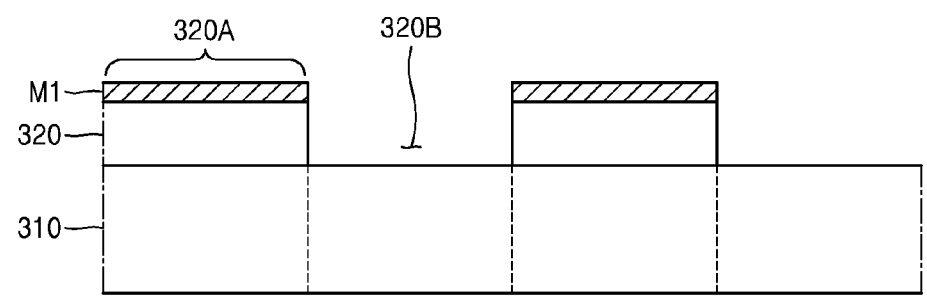

Referring to FIG. 12, the first layer 320 may be patterned and etched based on a pattern of the first mask M1 having a pattern corresponding to first regions 320A and second regions 320B. In such an embodiment, wire grids may be provided, e.g., formed, in the first regions 320A, and wire grids may not be provided in the second regions 320B. In such an embodiment, the first regions 320A, in which wire grids are subsequently formed, and the second regions 320B, in which no wire grid is subsequently formed, may be defined by a patterning process using the first mask M1. In one embodiment, for example, the patterning process may be performed by photolithography.

Figure 13:
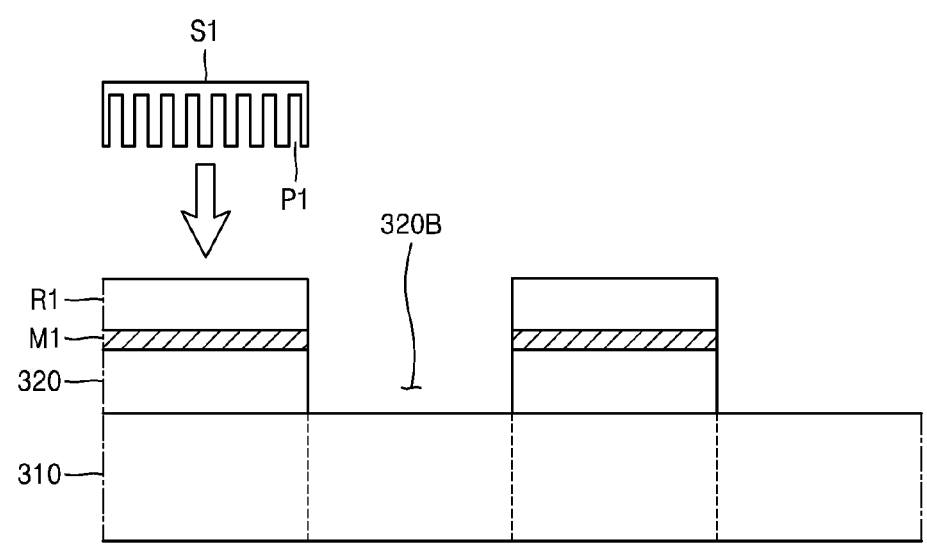
Figure 14:
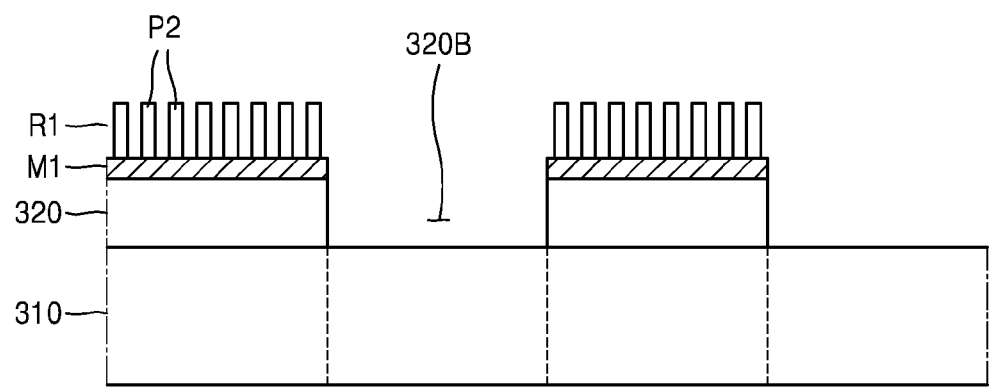
Figure 15:
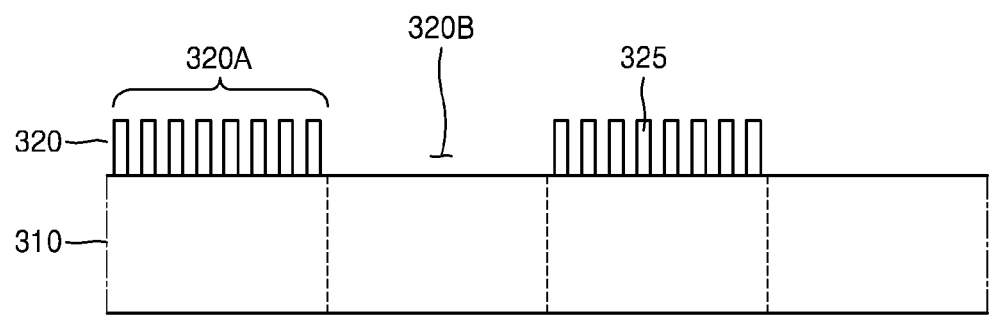

Next, wire grids may be formed in the first regions 320A through a nanoimprinting process. In an embodiment, as shown in FIG. 13, in the nanoimprinting process, a first resin layer R1 may be formed on the first mask M1. Then, the first resin layer R1 is patterned using a first stamp S1. The first stamp S1 may have a first pattern P1, and the first pattern P1 may be transferred to the first resin layer R1 to form a second pattern P2 in the first resin layer R1. The second pattern P2 may be sequentially formed in other regions of the first resin layer R1 using the first stamp S1. Referring to FIG. 15, first wire grids 325 may be formed in the first regions 320A by etching the first layer 320 using the second pattern P2 and removing the first resin layer R1 and the first mask M1. In such a process, when the first pattern P1 of the first stamp S1 is transferred to the first resin layer R1, lateral portions of the first resin layer R1 may be pushed away, and thus the second pattern P2 may be deformed. If the first regions 320A are directly stamped using the first stamp S1 in a state where the second regions 320B is not provided between the first regions 320A, e.g., in a state where the first regions 320A are disposed adjacent to each other, the second pattern P2 may be further deformed due to an adjacent second pattern P2. In an embodiment of the present invention, however, the second regions 320B, in which no wire grid is formed, are provided adjacent to the first regions 320A, and thus, deformation of the second pattern P2 may be suppressed. In such an embodiment, the first wire grids 325 are formed in the first regions 320A using the less-deformed second pattern P2 of the first resin layer R1, such that defects caused by deformation of the first wire grids 325 may be reduced. In such an embodiment, since the second pattern P2 is formed in the first resin layer R1 corresponding to the first regions 320A through a simple process using the first stamp S1, the first wire grids 325 may be rapidly formed in the first regions 320A throughout a large area. In such a process, connection portions between the first regions 320A may be deformed. However, according to an embodiment of the invention, the first regions 320A are discontinuously arranged, such that the connection portions between the first regions 320A may be minimized. Thus, when a wire grid polarizer having a large area is manufactured using such an embodiment of a method, defects caused by deformation may be substantially reduced.

Figure 16:
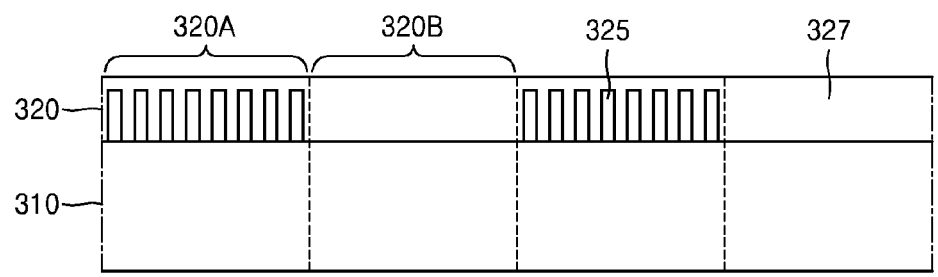

Referring to FIG. 16, a first protection layer 327 may be formed on the first regions 320A and the second regions 320B. A second layer 330 may be formed on the first protection layer 327. A second mask M2 is disposed on the second layer 330.

Figure 17:
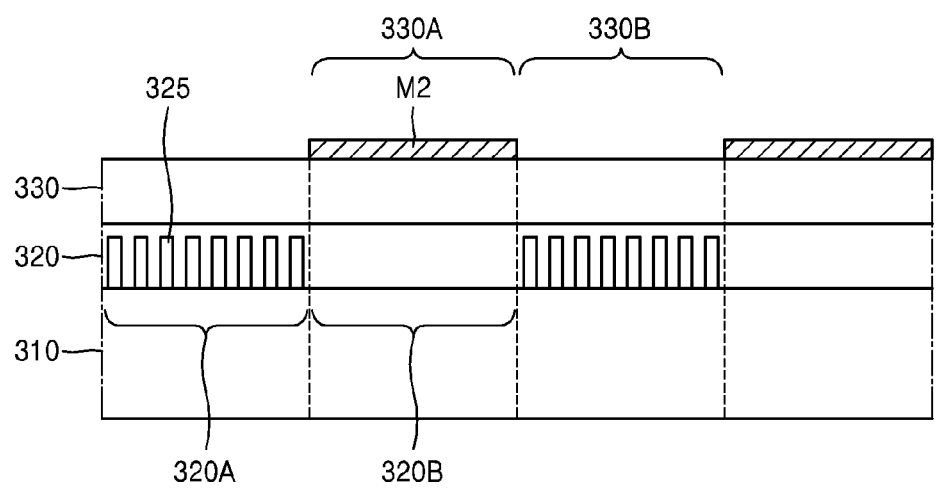
Figure 18:
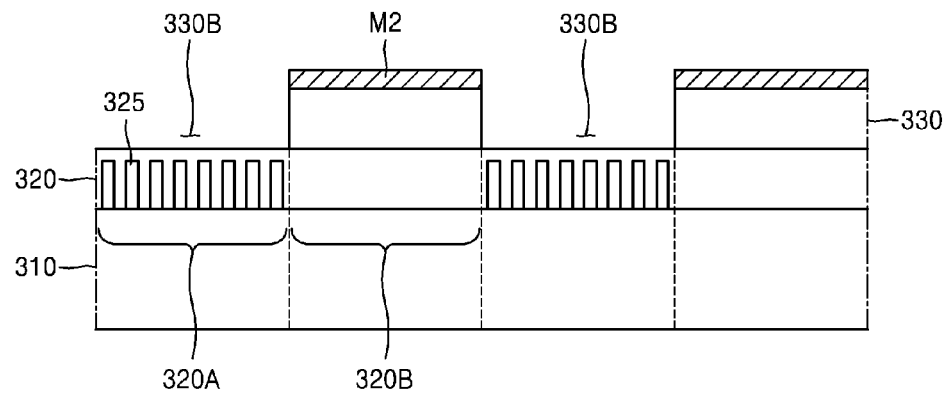

Referring to FIGS. 17 and 18, the second layer 330 may be patterned and etched based on a pattern of the second mask M2 to form third regions 330A and fourth regions 330B. In such an embodiment, wire grids may be subsequently formed in the third regions 330A, and no wire grid may be subsequently formed in the fourth regions 330B. In such an embodiment, the third regions 330A, in which wire grids are formed, and the fourth regions 330B, in which no wire grid is formed, may be defined by a patterning process using the second mask M2. In one embodiment, for example, the patterning process may be performed by photolithography.

Figure 19:
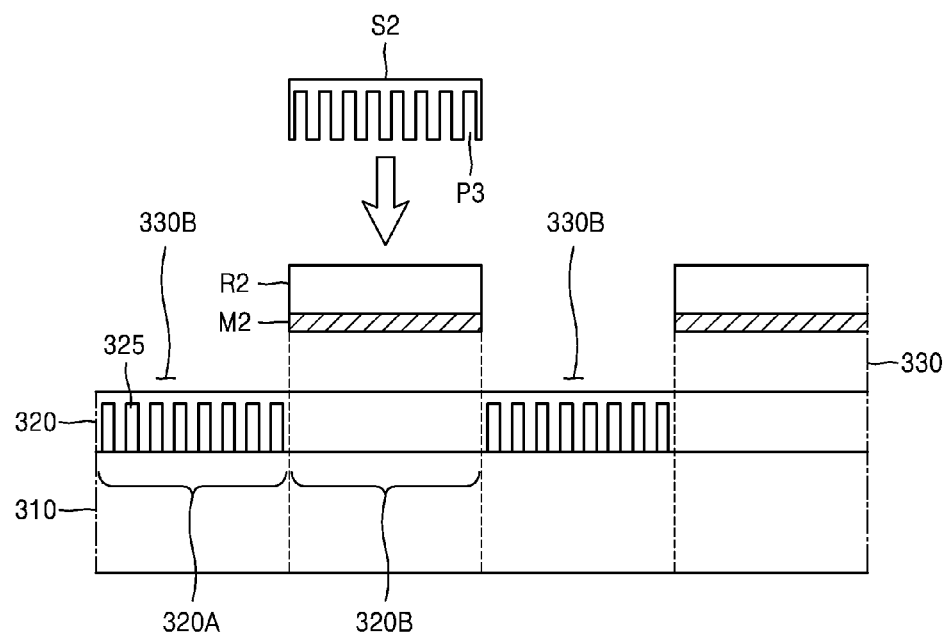
Figure 20:
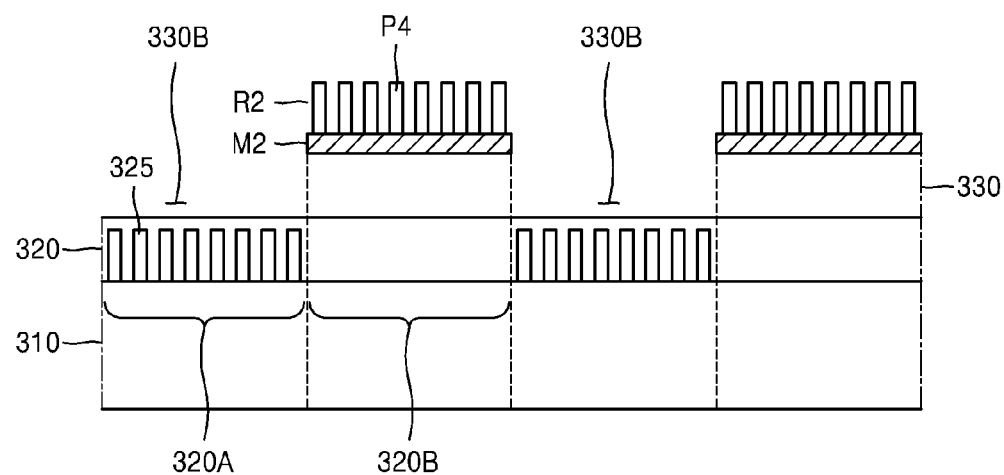
Figure 21:
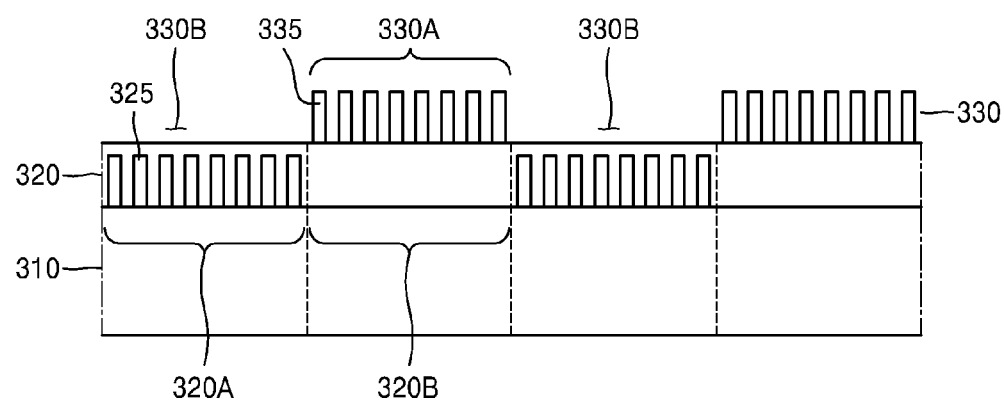
Figure 22:
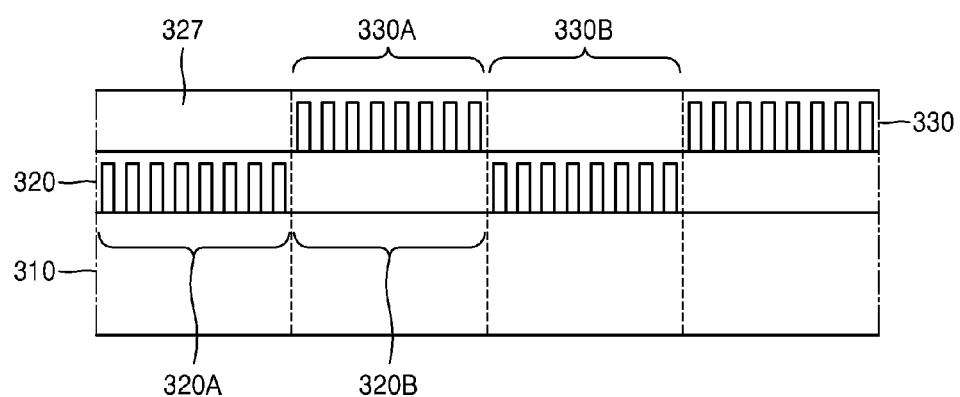

Next, wire grids may be formed in the third regions 330A through a nanoimprinting process. As shown in FIG. 19, in the nanoimprinting process, a second resin layer R2 may be formed on the second mask M2. Then, the second resin layer R2 is patterned using a second stamp S2. The second stamp S2 may have a third pattern P3, and the third pattern P3 may be transferred to the second resin layer R2 to form a fourth pattern P4 in the second resin layer R2. The fourth pattern P4 may be sequentially formed in other regions of the second resin layer R2 using the second stamp S2. Referring to FIG. 21, second wire grids 335 may be formed in the third regions 330A by etching the second layer 330 using the fourth pattern P4 and removing the second resin layer R2 and the second mask M1. In such a process, when the third pattern P3 of the second stamp S2 is transferred to the second resin layer R2, lateral portions of the second resin layer R2 may be pushed away, and thus the fourth pattern P4 may be deformed. If the third regions 330A are directly stamped using the second stamp S2 in a state where the fourth regions 330B is not provided between the third regions 330A, the fourth pattern P4 may be further deformed due to an adjacent fourth pattern P4. In an embodiment of the invention, however, the fourth regions 330B, in which wire grids are formed, are provided adjacent to the third regions 330A, and thus, deformation of the fourth pattern P4 may be suppressed. In an embodiment, the second wire grids 335 are formed in the third regions 330A using the less-deformed fourth pattern P4, such that defects caused by deformation of the second wire grids 335 may be reduced. In such an embodiment, the fourth pattern P4 is formed in the second resin layer R2 corresponding to the third regions 330A through a simple process using the second stamp S2, such that the second wire grids 335 may be rapidly formed in the third regions 330A throughout a large area. In such a process, connection portions between the third regions 330A may be deformed. However, according to an embodiment of the invention, the third regions 330A are discontinuously arranged, such that the connection portions between the third regions 330A may be minimized. Thus, when a wire grid polarizer having a large area is manufactured using such an embodiment of a method, defects caused by deformation may be reduced.

In an embodiment of the invention, as described above, the first regions 320A and the second regions 320B are defined or formed in the first layer 320 by patterning, and then the first wire grids 325 are discontinuously formed only in the first regions 320A, thus suppressing deformation that may occur when the first wire grids 325 are formed in the first regions 320A through a nanoimprinting process. In such an embodiment, the third regions 330A and the fourth regions 330B are defined or formed in the second layer 330 by patterning, and then the second wire grids 335 are discontinuously formed only in the third regions 330A, thus suppressing deformation that may occur when the second wire grids 335 are formed in the third region 330A through a nanoimprinting process. As described above, in such an embodiment, a first nanoimprinting process for discontinuously forming the first wire grids 325 and a second nanoimprinting process for discontinuously forming the second wire grids 335 may be separately performed, such that deformation caused by a nanoimprinting process may be reduced, and thus a wire grid polarizer having a large area may be effectively and efficiently manufactured.

An embodiment of the wire grid polarizers 100 and 200 illustrated in FIGS. 7 to 9, which have a three layer structure, may be manufactured through the nanoimprinting process described above with reference to FIGS. 14 to 22 by forming an additional layer of wire grids thereon.

Next, another embodiment of a method of manufacturing a wire grid polarizer according to the invention will be described with reference to FIGS. 23 to 31.

Figure 23:
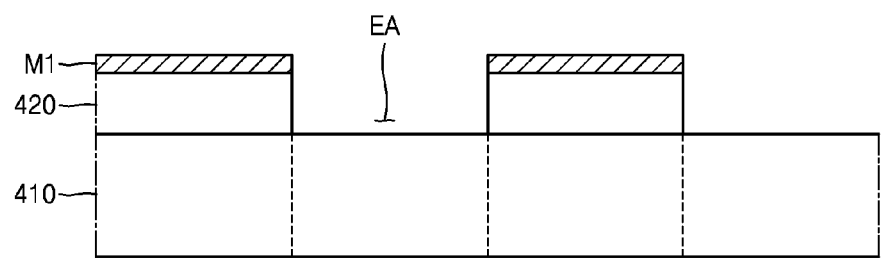
FIGS. 23 to 31 are views illustrating another embodiment of a method of manufacturing a wire grid polarizer according to the invention.

Referring to FIG. 23, a first layer 420 is provided, e.g., disposed, on a substrate 410, and a first mask M1 is provided on the first layer 420. The substrate 410 may be a transparent substrate that transmits light. In one embodiment, for example, the substrate 410 may be a glass substrate or a transparent plastic substrate. The first layer 420 may include or be formed of a metal. In one embodiment, for example, the first layer 420 may include aluminum (Al), silver (Ag), gold (Au), copper (Cu), nickel (Ni), platinum (Pt) or a combination thereof.

Figure 24:
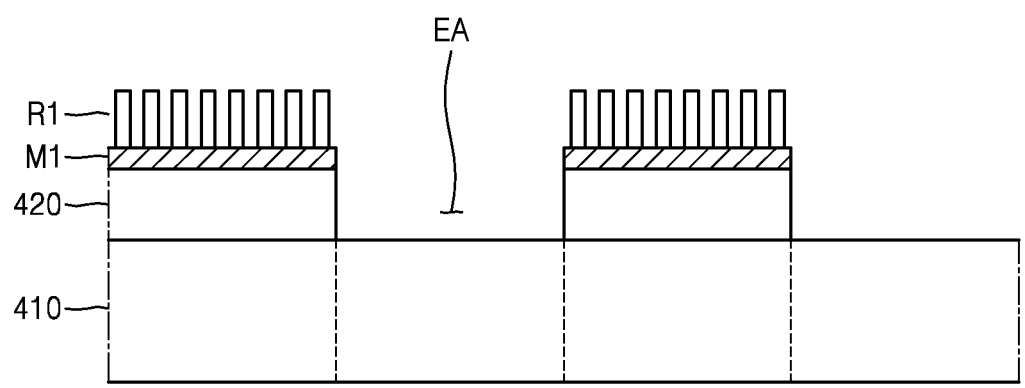

Referring to FIG. 24, the first layer 420 may be patterned and etched based on a pattern of the first mask M1 to define first regions 420A (refer to FIG. 25) and second regions EA on the substrate 410. Subsequently, wire grids may be formed in the first regions 420A, and no wire grid may be formed in the second regions EA. In such an embodiment, the first regions 420A, in which wire grids are formed, and the second regions EA, in which no wire grid is formed, may be defined by a patterning process using the first mask M1. In one embodiment, for example, the patterning process may be performed by photolithography.

Figure 25:
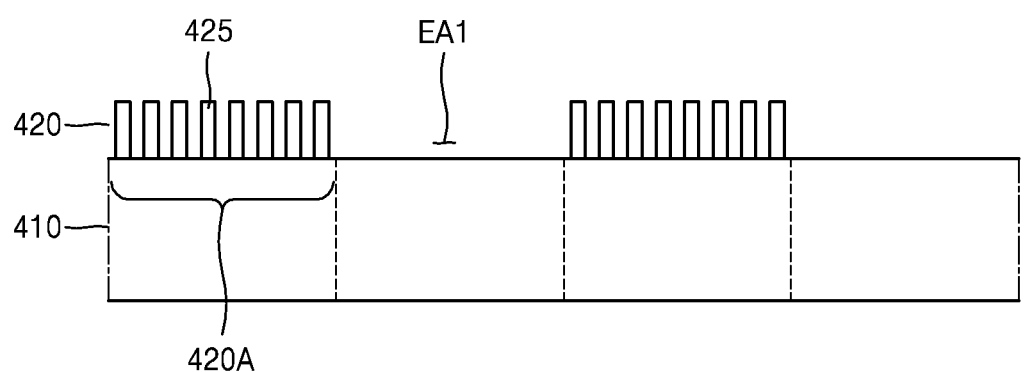

Next, referring to FIGS. 24 and 25, first wire grids 425 may be formed in the first regions 420A through a nanoimprinting process. The nanoimprinting process is substantially the same as that described above with reference to FIGS. 13 and 14, and any repetitive detailed description thereof will be omitted.

In an embodiment, the first wire grids 425 are discontinuously formed by the nanoimprinting process, as described above, connection portions between the first wire grids 425 may be less deformed than a case where the first wire grids 425 are continuously formed.

Figure 26:
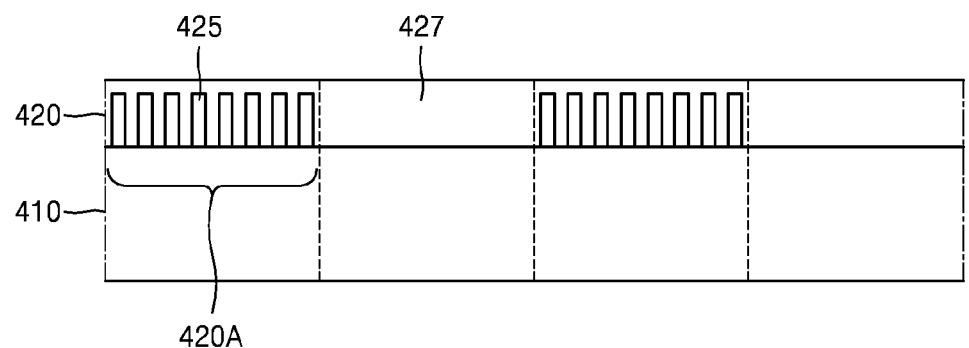
Figure 27:
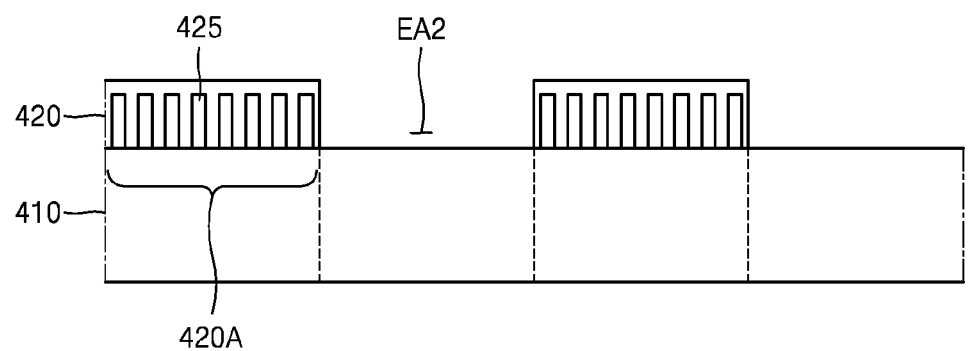

Next, referring to FIG. 26, a first protection layer 427 may be formed on the first layer 420. Thereafter, referring to FIGS. 26 and 27, the first protection layer 427 may be patterned using a mask M to form third regions EA2 between the first regions 420A. The third regions EA2 may be substantially the same as the second regions EA. In such an embodiment, the first regions 420A may be protected by the first protection layer 427, and a portion of the substrate 410 corresponding to the third regions EA2 may be exposed through the third regions EA2.

In such an embodiment, the first wire grids 425 are discontinuously formed, such that deformation that may occur when the first wire grids 425 are formed through the nanoimprinting process may be reduced.

Figure 28:
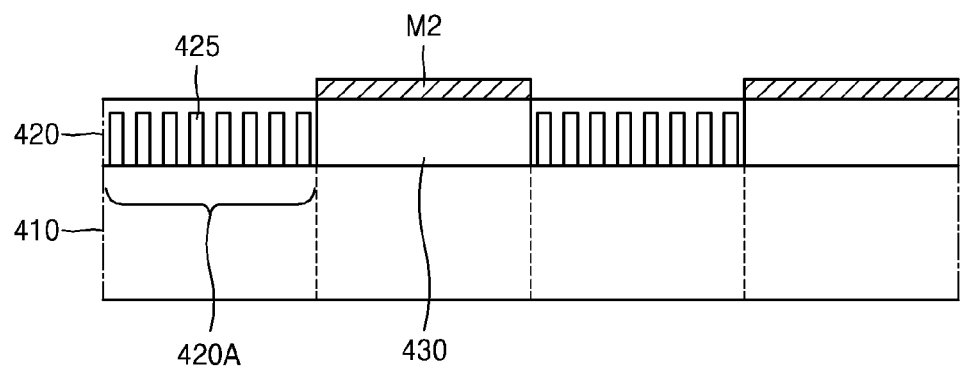

Next, referring to FIG. 28, a second layer 430 is provided, e.g., disposed, on the third regions EA2. The second layer 430 may be disposed only on the third regions EA2 using a mask M. The second layer 430 may include a metal. In one embodiment, for example, the second layer 420 may include aluminum (Al), silver (Ag), gold (Au), copper (Cu), nickel (Ni), platinum (Pt) or a combination thereof.

Figure 29:
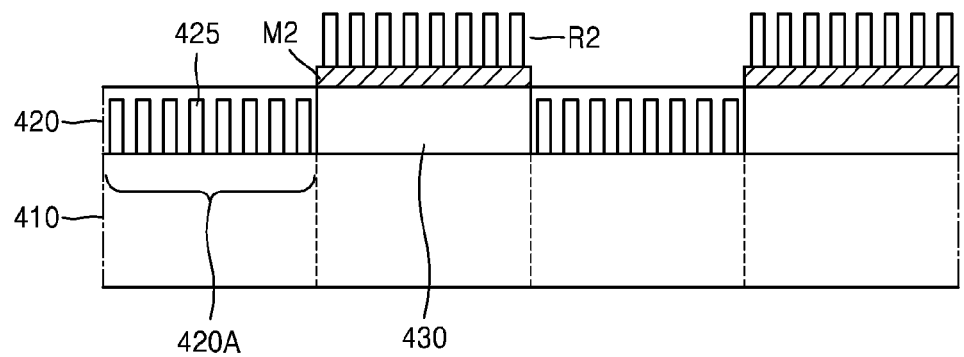
Figure 30:
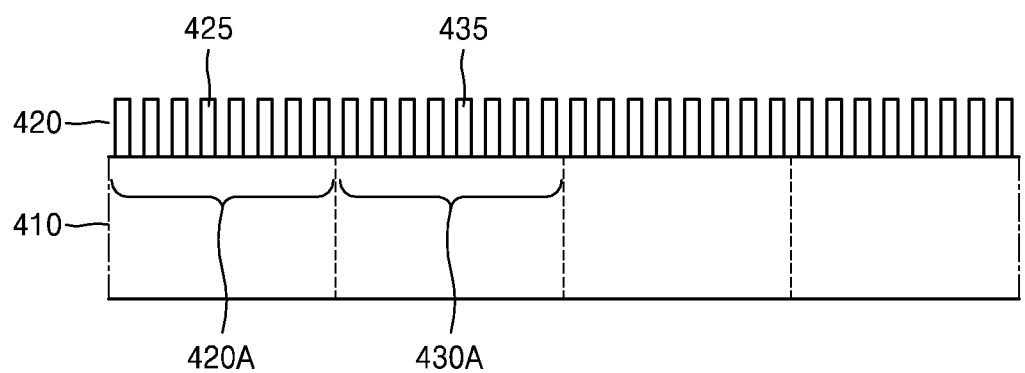

A second mask M2 is disposed on the second layer 430. Referring to FIG. 29, a second resin layer R2 may be disposed on the second mask M2, and second wire grids 435 may be formed in the third regions EA2 through a nanoimprinting process. In such a process, if the second resin layer R2 is deformed, the second wire grids 435 formed by etching the second resin layer R2 may also be deformed. In an embodiment, as shown in FIG. 29, the second resin layer R2 is discontinuously formed, such that deformation of the second resin layer R2 may be reduced. Thus, deformation of the second wire grids 435 may be reduced.

Figure 31:
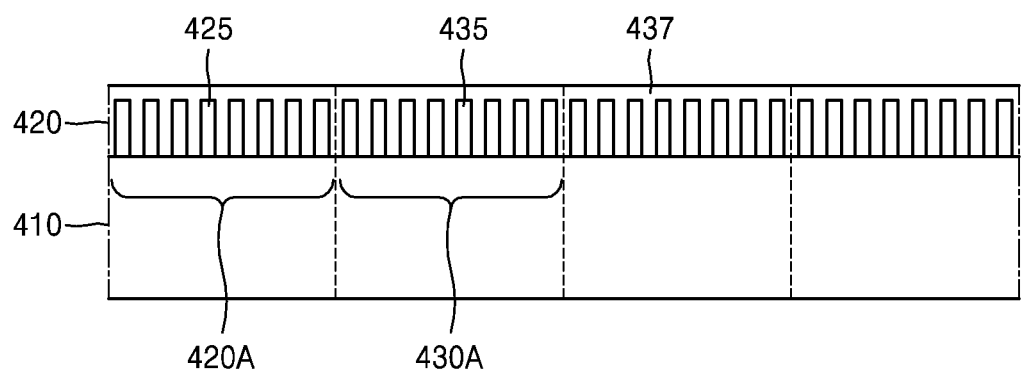

Referring to FIG. 31, a second protection layer 437 may further be formed to protect the first wire grids 425 and the second wire grids 435. In such an embodiment, the first wire grids 425 and the second wire grids 435 may be formed in a same layer as each other.

According to an embodiment of a wire grid polarizer manufacturing method of the invention, a first nanoimprinting process for forming first wire grids and a second nanoimprinting process for forming second wire grids may be separately performed in different regions. Therefore, in such an embodiment, deformation that may be caused when a nanoimprinting process is performed in a continuous region may be reduced. In such an embodiment of the wire grid polarizer manufacturing method, a wire grid polarizer having a large area may be effectively and efficiently manufactured through nanoimprinting processes, and the productivity of manufacturing processes thereof may be improved.

It should be understood that exemplary embodiments described therein should be considered in a descriptive sense only and not for purposes of limitation. Descriptions of features or aspects within each embodiment should typically be considered as available for other similar features or aspects in other embodiments.

While one or more embodiments of the invention have been described with reference to the figures, it will be understood by those of ordinary skill in the art that various changes in form and details may be made therein without departing from the spirit and scope of the invention as defined by the following claims.

What is claimed is:

1. A liquid crystal display comprising:
a light source unit;
a first substrate disposed on the light source unit;
an electrode layer disposed on the first substrate;
a second substrate separate from the electrode layer;
a polarizing plate disposed on the second substrate;
a liquid crystal layer disposed between the electrode layer and the second substrate; and
a wire grid polarizer disposed between the light source and the first substrate, wherein the wire grid polarizer comprises:
a first layer, in which a first region and a second region are defined, wherein a first wire grid comprising a plurality of first wires is disposed in the first region, the first wires are spaced apart from each other, and no wire grid is disposed in the second region;
a second layer disposed on the first layer and in which a third region and a fourth region are defined, wherein a second wire grid comprising a plurality of second wires is disposed in the third region, the second wires are spaced apart from each other, and no wire grid is disposed in the fourth region; and
a third layer disposed on the second protection layer, wherein a fifth region and a six region are defined in the third layer, a third wire grid comprising a plurality of third wires is disposed in the fifth region, the third wires are spaced apart from each other, and no wire grid is disposed in the sixth region,
wherein the first region, the third region and the fifth region do not overlap each other, the second region, the fourth region and the sixth region do not overlap each other, and the first region, second region, third region, fourth region, fifth region, and sixth region are arranged regularly.

2. The liquid crystal display of claim 1, wherein the first to sixth regions are arranged in such a manner that the first wires, the second wires, and the third wires are arranged at regular intervals when viewed from a top plan view.

3. The liquid crystal display of claim 1, wherein the fourth region is disposed to correspond to the first region and the third region is disposed to correspond to the second region such that the first wires and the second wires are arranged with each other at regular intervals when viewed from a top plan view.

4. The liquid crystal display of claim 1, wherein each of the first wires, the second wires, and the third wires comprises a metal.

5. The liquid crystal display of claim 4, wherein the metal of each of the first wires, the second wires, and the third wires comprises aluminum (Al), silver (Ag), gold (Au), copper (Cu), nickel (Ni), platinum (Pt) or a combination thereof.

6. The liquid crystal display of claim 1, wherein the second layer further comprises a second protection layer which covers the second wire grid.

7. A liquid crystal display comprising:
a light source unit;
a first substrate disposed on the light source unit;
an electrode layer disposed on the first substrate;
a second substrate separate from the electrode layer;
a polarizing plate disposed on the second substrate;
a liquid crystal layer disposed between the electrode layer and the second substrate; and
a wire grid polarizer disposed between the light source and the first substrate,
wherein the wire grid polarizer comprises:
   a first layer, in which a first region and a second region are defined, wherein a first wire grid comprising a plurality of first wires is disposed in the first region, the first wires are spaced apart from each other, and no wire grid is disposed in the second region;
   a second layer disposed on the first layer and in which a third region and a fourth region are defined, wherein a second wire grid comprising a plurality of second wires is disposed in the third region, the second wires are spaced apart from each other, and no wire grid is disposed in the fourth region; and
a third layer disposed on the second protection layer, wherein a fifth region and a six region are defined in the third layer, a third wire grid comprising a plurality of third wires is disposed in the fifth region, the third wires are spaced apart from each other, and no wire grid is disposed in the sixth region, wherein the first region, the third region and the fifth region partially overlap each other, the second region, the fourth region and the sixth region partially overlap each other, and
only two of the first wires, the second wires and the third wires are arranged to overlap each other across the first layer, the second layer and the third layer.

8. A wire grid polarizer comprising:
a substrate;
a first layer disposed on the substrate, wherein a first region and a second region are defined in the first layer, and the first layer comprises: a first wire grid comprising a plurality of first wires and disposed in the first region, wherein the first wires are spaced apart from each other, and no wire grid is disposed in the second region;
a first protection layer which covers the first and second regions;
a second layer disposed on the first layer, wherein a third region and a fourth region are defined in the second layer, and the second layer comprises a second wire grid comprising a plurality of second wires and disposed in the third region, wherein the second wires are spaced apart from each other, and no wire grid is disposed in the fourth region, and
a third layer disposed on the second protection layer, wherein a fifth region and a six region are defined in the third layer, a third wire grid comprising a plurality of third wires is disposed in the fifth region, the third wires are spaced apart from each other, and no wire grid is disposed in the sixth region,
wherein the first region, the third region and the fifth region do not overlap each other, the second region, the fourth region and the sixth region do not overlap each other, and the first region, second region, third region, fourth region, fifth region, and sixth region are arranged regularly.

9. The wire grid polarizer of claim 8, wherein a plurality of first wire grids, a plurality of second wire grids, and a plurality of third wire grids are disposed along the first layer, the second layer, and the third layer, respectively.

10. The wire grid polarizer of claim 8, wherein the fourth region is disposed to correspond to the first region and the third region is disposed to correspond to the second region such that the first wires and the second wires are arranged with each other at regular intervals when viewed from a top plan view.

11. The wire grid polarizer of claim 8, wherein each of the first wires, the second wires, and the third wires comprises a metal.

* * * * *